J. HARE, Jr.
OIL COCK.
No. 27,902.  Patented Apr. 17, 1860.
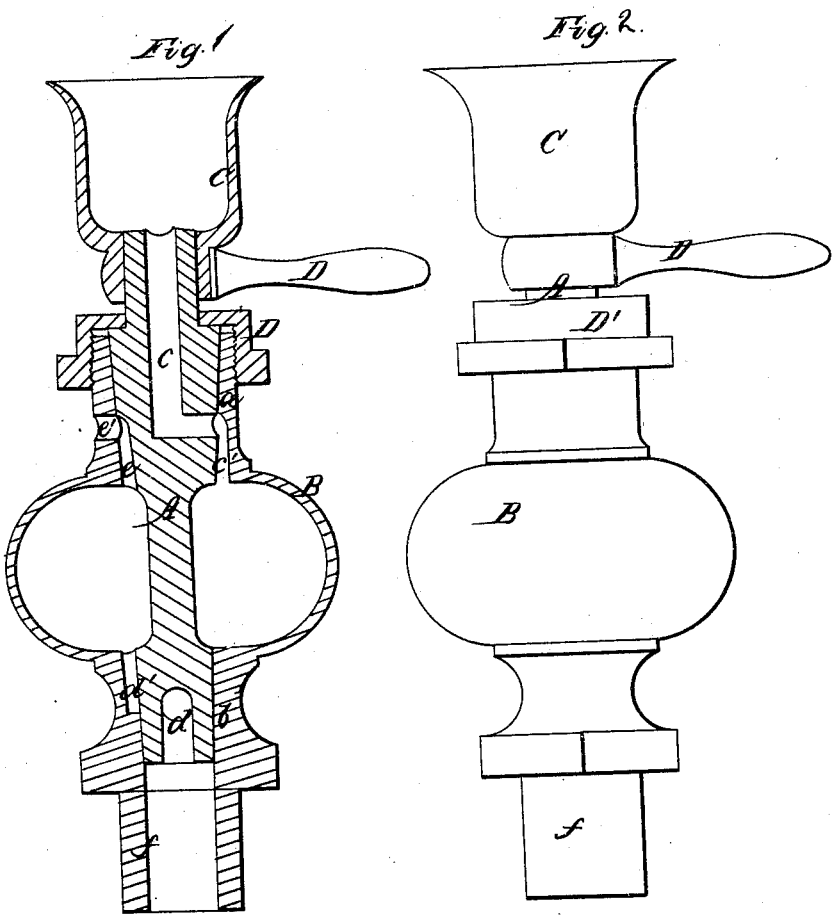
Witnesses
J W Coombs
Chas Crux
Inventor
James Hare Jr

UNITED STATES PATENT OFFICE.

JAMES HARE, JR., OF PATERSON, NEW JERSEY.

OIL-COCK.

Specification of Letters Patent No. 27,902, dated April 17, 1860.

*To all whom it may concern:*

Be it known that I, JAMES HARE, Jr., of Paterson, in the county of Passaic and State of New Jersey, have invented a new and Improved Oil-Cock; and I do hereby declare that the following is a full, clear, and exact description of the same, reference being had to the accompanying drawing, forming a part of this specification, in which—

Figure 1 represents a vertical central section of my invention; Fig. 2, a side elevation of ditto.

Similar letters in both views indicate corresponding parts.

The oil cocks or lubricators as now in use, are all more or less faulty in their construction, and it is therefore very difficult to keep the working parts tight. At the same time most of these oil cocks are so complicated that their construction is very expensive. To make a good and cheap oil cock, the number of the joints ought to be reduced as much as possible, and the plug or plugs must be made so that they wear tight, and that no attention is required to keep them in order. Such is the construction of my oil cock, which I will now describe with reference to the drawing.

The plug A, of my oil cock passes clear through the globe B, and it is fitted into the two seats $a$, and $b$; one above and the other below the globe. Secured to the upper part of the plug is the cup C, and the handle D, and an angular passage $c$, leads from the cup to a recess $c'$, in the seat $a$, so that if by turning the plug the opening of the passage $o$, is brought opposite to the recess $c'$, the oil from the cup C, is allowed to enter into the globe B. In order to let the air escape from the interior of the globe, as the oil enters, a venthole $e'$ is made into the seat $a$, opposite to the recess $c'$, and a recess $e$, in the plug extends from said venthole down to the globe as clearly shown in Fig. 1, in the drawing. The position of the venthole $e'$ and recess $e$ must be such that both are opposite to each other, as soon as the opening of the passage $e$ comes opposite to the recess $e'$ and that the air is at liberty to escape as soon as the oil begins to enter. The lower part of the plug A, fits into the seat $b$, and it is perforated with an angular passage $d$, which extends down to the opening in the center of the stem $f$, of the globe, and a recess $d'$, is made into the seat $b$, opposite to the recess $e'$, in the seat $a$ in such a manner that in turning the plug the passage $d$ is brought opposite the recess $d'$, and that the oil from the globe is allowed to run down through the central opening in the stem $f$, of the globe. If the plug is brought in this position, the passage $c$, and the venthole $e'$ are both closed so that the steam or other compressed gas which may pass up through the passage $d$, into the globe is prevented from leaking out at the top, and at the same time, the pressure in the interior of the globe is made equal to the pressure in the interior of the cylinder or other vessel to which the oil cock may be attached.

In order to keep the plug down tight into the seat, I have fitted into the upper part of the globe, a nut D′, and a shoulder is turned to the plug which presents a bearing for the nut. By this arrangement the nut is not liable to work loose when the plug is operated, whereas if the nut employed to hold the plug in its seats, screws on a thin pin only, as is the case with F. Regester's lubricator, patented 1854; the plug works loose all the time, and there is a constant spilling of oil over the outside of the cylinder or other vessel to which the oil cock may be attached. With my arrangement the friction which has a tendency to turn the nut D′, acts on a circle smaller than the thread, and the thread is able to hold its place without moving. By these means my plug works tight at all times, there is no liability that it ever works loose and if it wears, a slight touch of the nut D′, is sufficient to tighten it up again.

The cost of constructing my oil cock is very small as compared with that of many other lubricators, and all its parts are so arranged that the same, when once fitted together, need no further attention.

What I claim as new, and desire to secure by Letters Patent is,

The arrangement of the nut D′, in combination with the movable plug A, and with the stationary globe B, constructed and operating substantially as, and for the purpose specified.

JAMES HARE, Jr.

Witnesses:
WM. DOUGLASS,
PERIGRINE SANDFORD.